US012699996B2

(12) United States Patent
Singh et al.

(10) Patent No.: US 12,699,996 B2
(45) Date of Patent: Aug. 4, 2026

(54) FACILITATION OF REAL-TIME PAYMENT NETWORK TRANSACTIONS

(71) Applicant: MASTERCARD INTERNATIONAL INCORPORATED, Purchase, NY (US)

(72) Inventors: Irina Singh, White Plains, NY (US); Shanthan Subramaniam, Baldwin Place, NY (US); Sandeep Malhotra, Greenwich, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 57 days.

(21) Appl. No.: 18/136,056

(22) Filed: Apr. 18, 2023

(65) Prior Publication Data

US 2023/0252466 A1     Aug. 10, 2023

Related U.S. Application Data

(63) Continuation of application No. 16/380,044, filed on Apr. 10, 2019, now Pat. No. 11,663,591.

(51) Int. Cl.
*G06Q 20/40* (2012.01)
*G06Q 20/10* (2012.01)

(52) U.S. Cl.
CPC ........... *G06Q 20/40* (2013.01); *G06Q 20/102* (2013.01); *G06Q 20/108* (2013.01)

(58) Field of Classification Search
None
See application file for complete search history.

(56) References Cited

U.S. PATENT DOCUMENTS

| | | | |
|---|---|---|---|
| 10,380,583 B1 | 8/2019 | Ellis et al. | |
| 2002/0023055 A1 | 2/2002 | Antognini et al. | |
| 2009/0099961 A1 | 4/2009 | Ogilvy | |
| 2010/0082462 A1* | 4/2010 | Yuan ..................... | H04W 12/06 |
| | | | 705/30 |

(Continued)

FOREIGN PATENT DOCUMENTS

| | | | | |
|---|---|---|---|---|
| WO | WO-2004031908 A2 * | 4/2004 | ............. | G06Q 20/02 |
| WO | 2010/054259 A1 | 5/2010 | | |
| WO | WO-2016044882 A1 * | 3/2016 | ........... | H04L 63/168 |

OTHER PUBLICATIONS

Indian Examination Report dated Sep. 15, 2023 which was issued in connection with Indian Patent Application No. 202117045969.

(Continued)

*Primary Examiner* — Divesh Patel
(74) *Attorney, Agent, or Firm* — Buckley, Maschoff & Talwalkar LLC

(57) ABSTRACT

A request for payment message is received. The message includes transaction data. A transaction identifier is generated. The transaction data is stored in association with the transaction identifier. The transaction identifier is transmitted to an acquirer bank. A request to retrieve data is received from a payer's bank. The request to retrieve data includes the transaction identifier. At least some of the transaction data is transmitted to the payer's bank. A confirmation is received from the payer's bank. The confirmation indicates that a real-time payment has been made in accordance with the request for payment message.

17 Claims, 7 Drawing Sheets

(56) References Cited

U.S. PATENT DOCUMENTS

| | | | | |
|---|---|---|---|---|
| 2014/0018871 A1 | 1/2014 | Zhu | | |
| 2015/0134539 A1 | 5/2015 | Kapur | | |
| 2016/0155122 A1* | 6/2016 | Patterson | ............... | G06Q 20/40 |
| | | | | 705/44 |
| 2016/0180325 A1* | 6/2016 | Davis | .................... | G06Q 20/40 |
| | | | | 705/44 |
| 2016/0358172 A1* | 12/2016 | Ziat | ...................... | G06Q 20/326 |
| 2017/0017809 A1 | 1/2017 | Conti | | |
| 2017/0039559 A1* | 2/2017 | Frieden | ................. | G06Q 20/40 |
| 2018/0144326 A1* | 5/2018 | Finch | ................. | G06Q 20/3825 |
| 2018/0365670 A1 | 12/2018 | Dunjic et al. | | |

OTHER PUBLICATIONS

892 Form dated Mar. 31, 2020 which was received in connection with U.S. Appl. No. 16/380,044.

Information Disclosure Statement form SB/08 dated Jul. 16, 2020 which was filed in connection with U.S. Appl. No. 16/380,044.

PCT International Search Report and the Written Opinion, International Searching Authority, Jun. 11, 2020 Nov. 6, 2020), for International Application No. PCT/US2020/023059, 6pgs.

892 Form dated Sep. 18, 2020 which was received in connection with U.S. Appl. No. 16/380,044.

892 Form dated Jun. 24, 2021 which was received in connection with U.S. Appl. No. 16/380,044.

892 Form dated Jan. 10, 2022 which was received in connection with U.S. Appl. No. 16/380,044.

892 Form dated Jun. 22, 2022 which was received in connection with U.S. Appl. No. 16/380,044.

Information Disclosure Statement form SB/08 dated Nov. 23, 2023 which was filed in connection with U.S. Appl. No. 16/380,044.

"Extented European Search Report", European Searching Authority, Nov. 28, 2022 (Nov. 28, 2022),. for European Application No. 20788155,9, 7pgs.

892 Form dated Jan. 23, 2023 which was received in connection with U.S. Appl. No. 16/380,044.

Notice of Allowance dated Jan. 23, 2023 which was issued in connection with U.S. Appl. No. 16/380,044.

Australian Examination Report dated Apr. 11, 2025 which was issued in connection with Australian Patent Application No. 2020272521.

Australian Third Examination Report dated Oct. 2, 2025 which was issued in connection with Australian Patent Application No. 2020272521.

Australian Second Examination Report dated Jul. 15, 2025 which was issued in connection with Australian Patent Application No. 2020272521.

European Examination Report dated Jul. 29, 2025 which was issued in connection with EP Patent Application No. 20788155.8.

Australian Fifth Examination Report dated Apr. 8, 2026 which was issued in connection with Australian Patent Application No. 2020272521.

* cited by examiner

102

FACILITATION OF REAL-TIME PAYMENT NETWORK TRANSACTIONS

CROSS-REFERENCE TO RELATED APPLICATIONS

This application is a continuation of U.S. patent application Ser. No. 16/380,044, filed on Apr. 10, 2019, in the United States Patent and Trademark Office, the entire disclosure of which is incorporated herein for all purposes

BACKGROUND

Real-time payment networks are in operation in a number of different countries around the world. These networks have a central infrastructure, which handles clearing and posting of payment transactions within seconds to bank accounts of payment transaction beneficiaries. Examples of existing real-time payment networks include UPI/IMPS in India, Zengin in Japan, FPS in the United Kingdom and the RTP network from TCH in the United States.

According to a manner of operating a real-time payment network, the payer in the transaction transmits a Request for Payment message to initiate a payment transaction. The message enables immediate electronic delivery of bill presentment details, payment due date, and other transaction details. The recipient of the message may approve or reject the request before the payment is implemented. Upon approval, payment is made immediately to the recipient.

This mode of operation, however, is not present in all real-time payment networks. In networks where such a Request for Payment functionality is present, the functionality may be accessed via a proprietary API (application program interface). Even real-time payment networks with Request for Payment functionality do not support use of that function for purchase transactions.

The present inventors have now recognized an opportunity to leverage real-time payment networks by facilitating payment through such networks with strong security for P2M (person-to-merchant), P2P (person-to-person) and other applications.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and example embodiments and which are not necessarily drawn to scale, wherein.

DESCRIPTION

In general, and for the purpose of introducing concepts of embodiments of the present disclosure, a payments computer serves as a trusted repository of transaction data to facilitate payment transactions via a real-time payment network. The bank (acquirer) for a payment requestor (party desiring to receive a payment), provides transaction data to the payments computer. The payments computer generates a unique transaction identifier, provides it to the acquirer, and stores the transaction data in association with the transaction data. The acquirer provides the transaction identifier to the payment requestor. Using a standard message format, the payment requestor submits the transaction identifier in a request for payment to the payer's bank. The payer's bank authenticates the payer and messages the payments computer with the transaction identifier to retrieve the transaction data. Based on the transaction data, the payer's bank presents transaction details to the payer for confirmation, and then initiates a transaction in a real-time payment network to credit the account of the payment requestor.

APIs are made available to support communication by other parties with the payments computer.

This payment technique may be implemented quickly and at low cost, while minimizing enrollment activities required of acquirer banks. In a P2M application, for instance, the merchant may receive payment for a purchase transaction in real time, without any delay due to clearing. Chargebacks and fraud are minimized because the payer approves every transaction.

Figure 1:
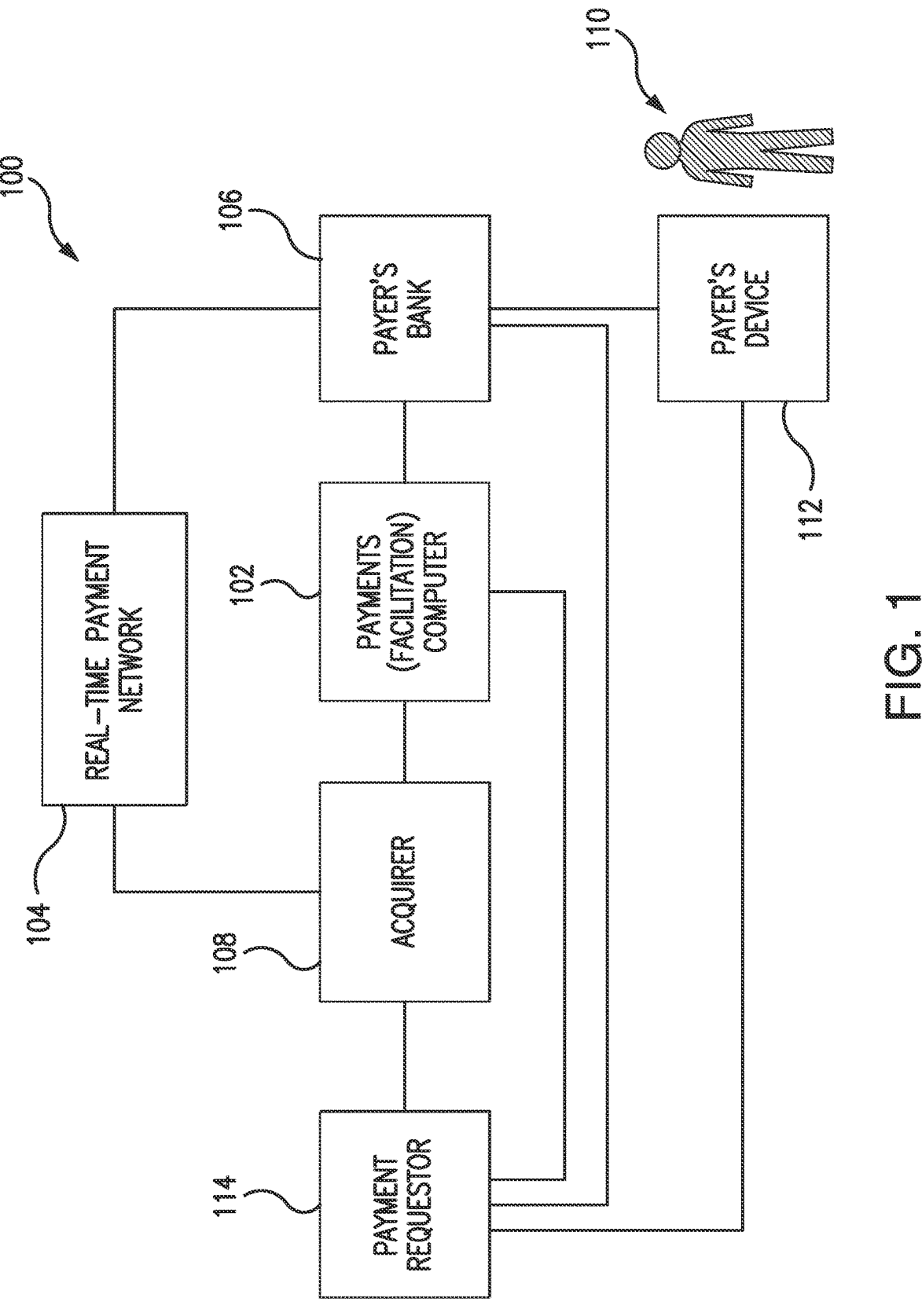
FIG. 1 is a block diagram of a payment system according to some embodiments.

FIG. 1 is a block diagram of a payment system 100 according to some embodiments.

A central component of the payment system 100 is a payments computer 102, which is described in detail below. For the time being, it will be mentioned that the payments computer 102 is a trusted repository of transaction data and facilitates use of a real-time payment network 104 for P2M, P2P, bill payment and other applications. The real-time payment network 104 need not be different from existing real-time payment networks, as referred to above.

The payment system 100 is illustrated in connection with a typical transaction that it handles. For that transaction, a payer's bank 106 and an acquirer bank 108 are, as will be seen, in communication with the payments computer 102. The payer for the illustrated transaction is indicated at 110. The payer 110 is shown operating a payer's device 112. The payer's device 112 may, but need not, be a mobile device such as a smartphone. The payment requestor for the transaction is represented at block 114. The payer's device 112 is in communication, at certain times, with the payment requestor 114 and the payer's bank 106. The payment requestor 114 is in communication, at certain times, with the acquirer 108 and the payer's bank 106, and also may receive communications from the payments computer 102. The payer's bank 106 and the acquirer 108 are assumed to have data connections with the real-time payment network 104.

Each block in FIG. 1 that represents an entity should also be understood to represent one or more computers operated by or on behalf of that entity.

As noted above, the payment system 100 is illustrated in FIG. 1 in the context of a single transaction. However, in a practical embodiment of the payment system 100, it may handle numerous transactions, including numerous simultaneous transactions. The system 100 may include many other payer's banks and acquirers besides those shown in FIG. 1 Many payment requestors may participate in the payment system 100, as may many payers, each of whom may do so via one or more payer's devices belonging to the payer.

An example of operation of the payment system 100 will be described below, particularly with reference to FIGS. 6A and 6B. First, though, there will be a further description of some components of the payment system 100.

Figure 2:
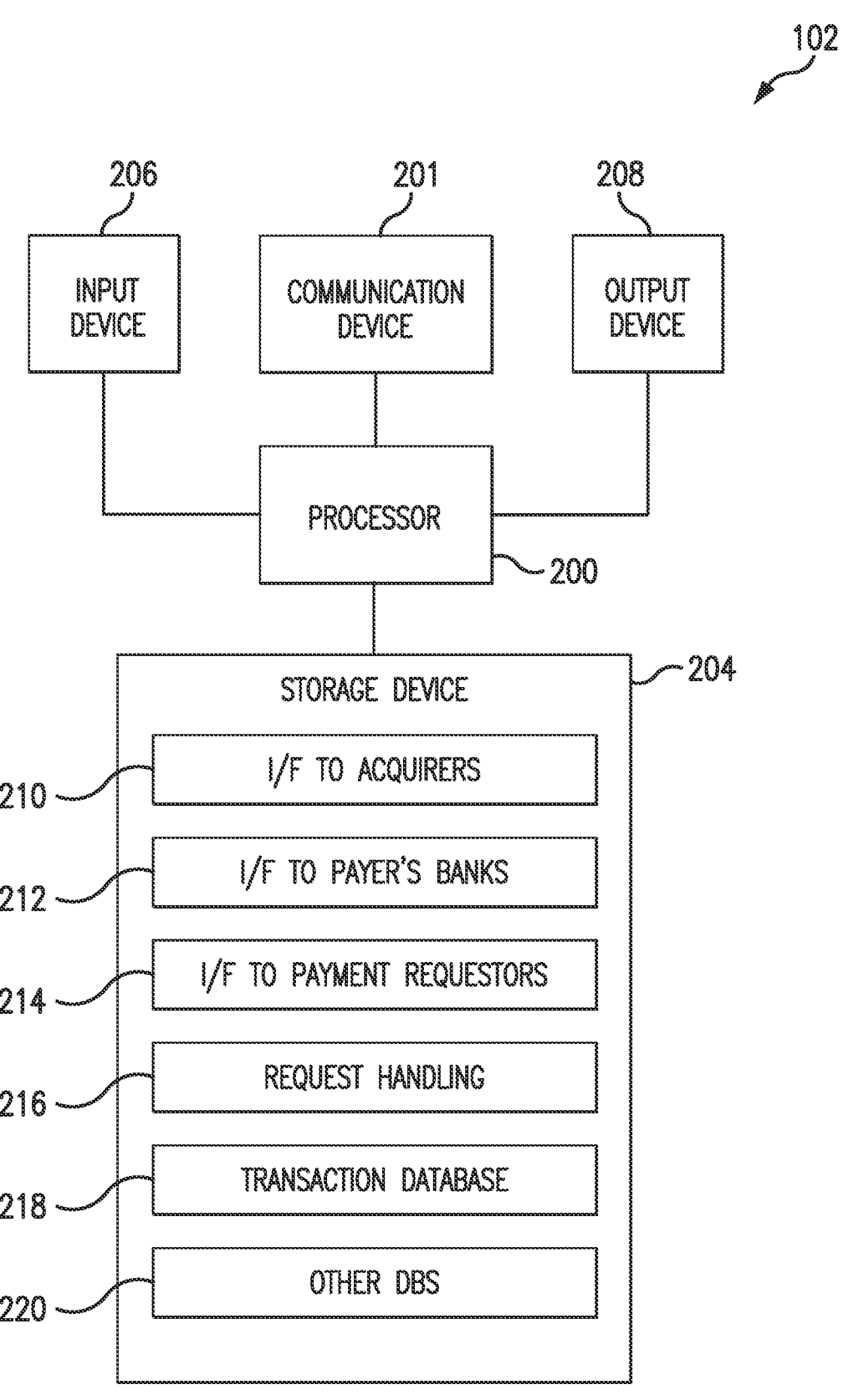
FIGS. 2, 3 and 4 are respectively block diagram illustrations of computer systems that may play a role in the payment system of FIG. 1.

FIG. 2 is a block diagram that illustrates an example embodiment of the payments computer 102 shown in FIG. 1. The payments computer 102 may, in its hardware aspects, resemble a typical mainframe or server computer, but may be controlled by software to cause it to function as described herein.

Referring to FIG. 2, the payments computer 102 may include a computer processor 200 operatively coupled to a communication device 201, a storage device 204, an input device 206 and an output device 208. The communications device 201, the storage device 204, the input device 206 and the output device 208 may all be in communication with the processor 200.

The computer processor 200 may be constituted by one or more processors. Processor 200 operates to execute processor-executable steps, contained in program instructions described below, so as to control the payments computer 102 to provide desired functionality.

Communication device 201 may be used to facilitate communication with, for example, other devices such as computers operated by or on behalf of acquirers and payer's banks. Communication device 201 may comprise numerous communication ports (not separately shown), to allow the payments computer 102 to communicate simultaneously with a considerable number of other computers, and/or to simultaneously handle a number of different requests from one other computer.

Input device 206 may comprise one or more of any type of peripheral device typically used to input data into a computer. For example, the input device 206 may include a keyboard and a mouse. Output device 208 may comprise, for example, a display and/or a printer.

Storage device 204 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 204 stores one or more programs for controlling processor 200. The programs comprise program instructions (which may be referred to as computer readable program code means) that contain processor-executable process steps of the payments computer 102, executed by the processor 200 to cause the payments computer 102 to function as described herein.

The programs may include one or more conventional operating systems (not shown) that control the processor 200 so as to manage and coordinate activities and sharing of resources in the payments computer 102, and to serve as a host for application programs (described below) that run on the payments computer 102.

The storage device 204 may also store a software interface 210 that facilitates communication between the payments computer 102 and computers operated by or for acquirers. The storage device 204 may in addition store a software interface 212 that facilitates communication between the payments computer 102 and computers operated by or for payers' banks. Still further, the storage device 204 may store a software interface 214 that facilitates communication from the payments computer 102 to payment requestors.

The programs stored in the storage device 204 may also include, for example, a request handling application program 216. The request handling application program 216 controls the processor 200 such that the payments computer 102 handles, in a manner described below, requests from acquirers and payers' banks in connection with desired real time payments via the real-time payment network 104 (FIG. 1).

Continuing to refer to FIG. 2, the storage device 204 may also store, and the payments computer 102 may also execute, other programs, which are not shown. For example, such programs may include communications software and a reporting application. The latter program may respond to requests from system administrators for reports on the activities performed by the payments computer 102. The other programs may also include, e.g., device drivers, database management software, etc.

Moreover, the storage device 204 may store a database 218 of transaction data held by the payments computer 102 for the purpose of facilitating real time payment transactions.

The storage device 204 may also store one or more other databases 220 needed for operation of the payments computer 102.

Figure 3:
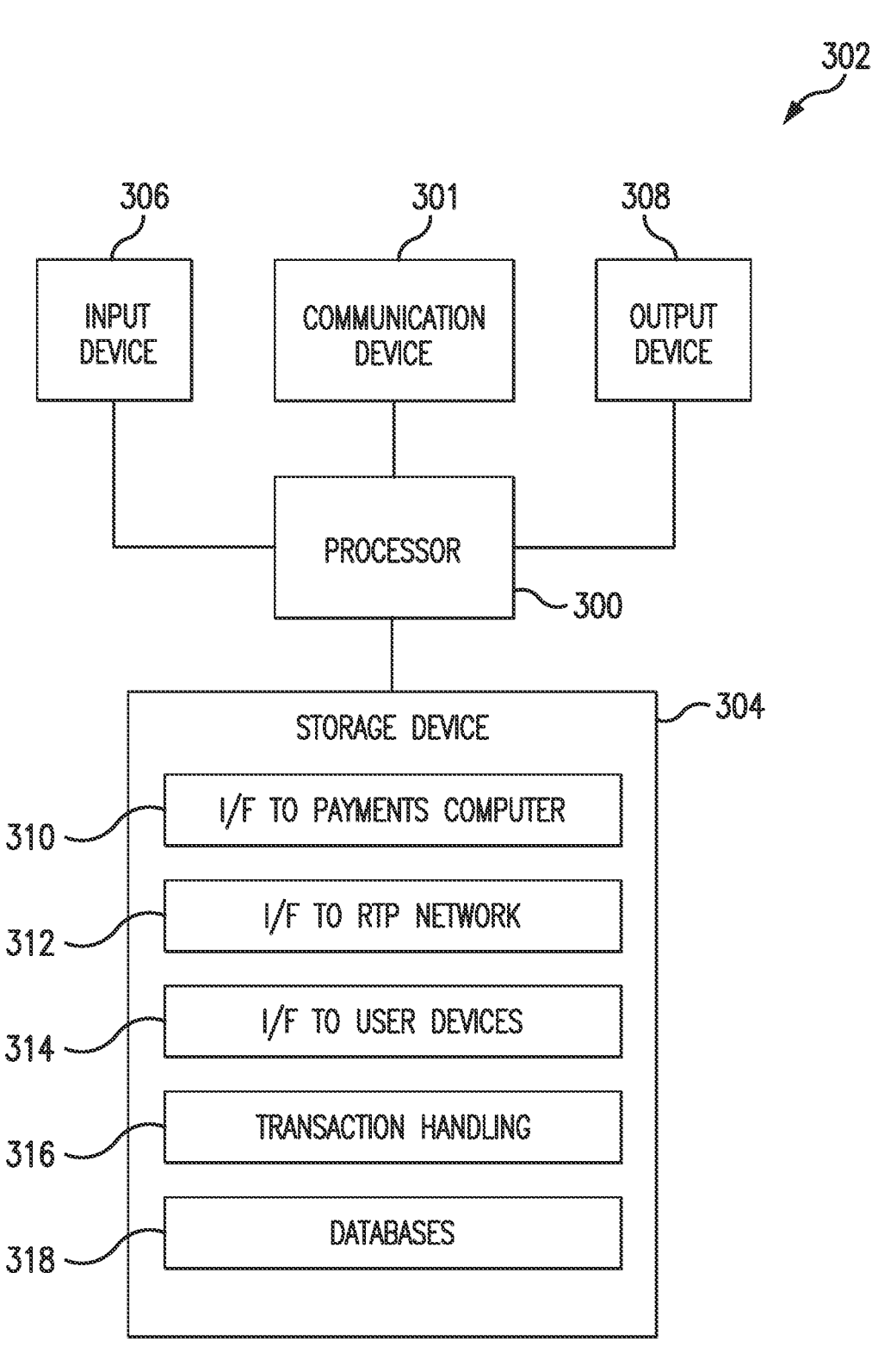

FIG. 3 is a block diagram that illustrates an example embodiment of a computer system 302 operated by or for the payer's bank 106 shown in FIG. 1. The computer system 302 will hereinafter be referred to as the "payer's bank computer." The payer's bank computer 302 may have the same type of architecture and may feature the same types of components as discussed above in connection with FIG. 2. Referring to FIG. 3, the payer's bank computer 302 may include a computer processor 300 operatively coupled to a communication device 301, a storage device 304, an input device 306 and an output device 308. The communications device 301, the storage device 304, the input device 306 and the output device 308 may all be in communication with the processor 300.

Storage device 304 stores one or more programs for controlling processor 300. The programs comprise program instructions (which may be referred to as computer readable program code means) that contain processor-executable process steps of the payer's bank computer 302, executed by the processor 300 to cause the payer's bank computer 302 to function as described herein.

The programs may include one or more conventional operating systems (not shown) that control the processor 300 so as to manage and coordinate activities and sharing of resources in the payer's bank computer 302, and to serve as a host for application programs (described below) that run on the payer's bank computer 302.

The storage device 304 may also store a software interface 310 that facilitates communication between the payer's bank computer 302 and the payments computer 102. The storage device 304 may in addition store a software interface 312 that facilitates communication between the payer's bank computer 302 and the real-time payment network 104. Still further, the storage device 304 may store a software interface 314 that facilitates communication from the payer's bank computer 302 to devices operated by users/payers.

The programs stored in the storage device 304 may also include, for example, a transaction handling application program 316. The transaction handling application program 316 program the processor 300 such that the payer's bank computer 302 handles, in a manner described below, payment transactions requested by users who have accounts at the payer's bank 106 (FIG. 1).

Continuing to refer to FIG. 3, the storage device 304 may also store, and the payer's bank computer 302 may also execute, other programs, which are not shown. For example, such programs may include communications software and a reporting application. The latter program may respond to requests from system administrators for reports on the activities performed by the payer's bank computer 302. The other programs may also include, e.g., device drivers, database management software, website hosting software, etc.

Moreover, the storage device 304 may store one or more databases 318 needed for operation of the payer's bank computer 302.

Figure 4:
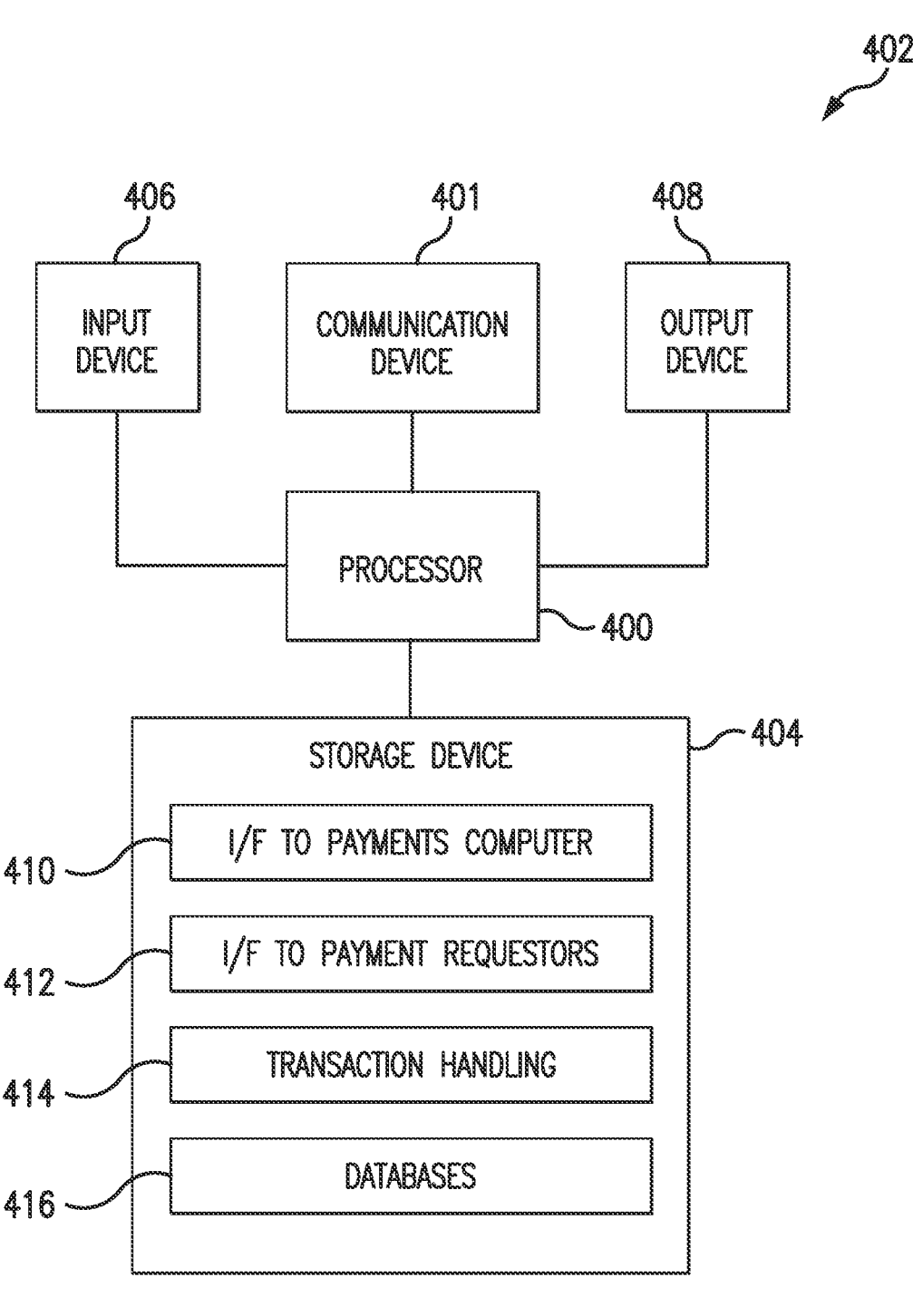

FIG. 4 is a block diagram that illustrates an example embodiment of a computer system 402 operated by or for the acquirer 108 shown in FIG. 1. The computer system 402 will hereinafter be referred to as the "acquirer computer." The acquirer computer 402 may have the same type of architecture and may feature the same types of components as discussed above in connection with FIG. 2. Referring to FIG. 4, the acquirer computer 402 may include a computer processor 400 operatively coupled to a communication device 401, a storage device 404, an input device 406 and an output device 408. The communications device 401, the storage device 404, the input device 406 and the output device 408 may all be in communication with the processor 400.

Storage device 404 stores one or more programs for controlling processor 400. The programs comprise program instructions (which may be referred to as computer readable program code means) that contain processor-executable process steps of the acquirer computer 402, executed by the processor 400 to cause the acquirer computer 402 to function as described herein.

The programs may include one or more conventional operating systems (not shown) that control the processor 400 so as to manage and coordinate activities and sharing of resources in the acquirer computer 402, and to serve as a host for application programs (described below) that run on the acquirer computer 402.

The storage device 404 may also store a software interface 410 that facilitates communication between the acquirer computer 402 and the payments computer 102. The storage device 404 may in addition store a software interface 412 that facilitates communication between the acquirer computer 402 and devices operated by payment requestors.

The programs stored in the storage device 404 may also include, for example, a transaction handling application program 414. The transaction handling application program 414 controls the processor 400 such that the acquirer computer 402 handles, in a manner described below, payment transactions requested by payment requestors who have banking relationships with the acquirer 108 (FIG. 1).

Continuing to refer to FIG. 4, the storage device 404 may also store, and the acquirer computer 402 may also execute, other programs, which are not shown. For example, such programs may include communications software and a reporting application. The latter program may respond to requests from system administrators for reports on the activities performed by the acquirer computer 402. The other programs may also include, e.g., device drivers, database management software, website hosting software, etc.

Moreover, the storage device 404 may store one or more databases 416 needed for operation of the acquirer computer 402.

Figure 5:
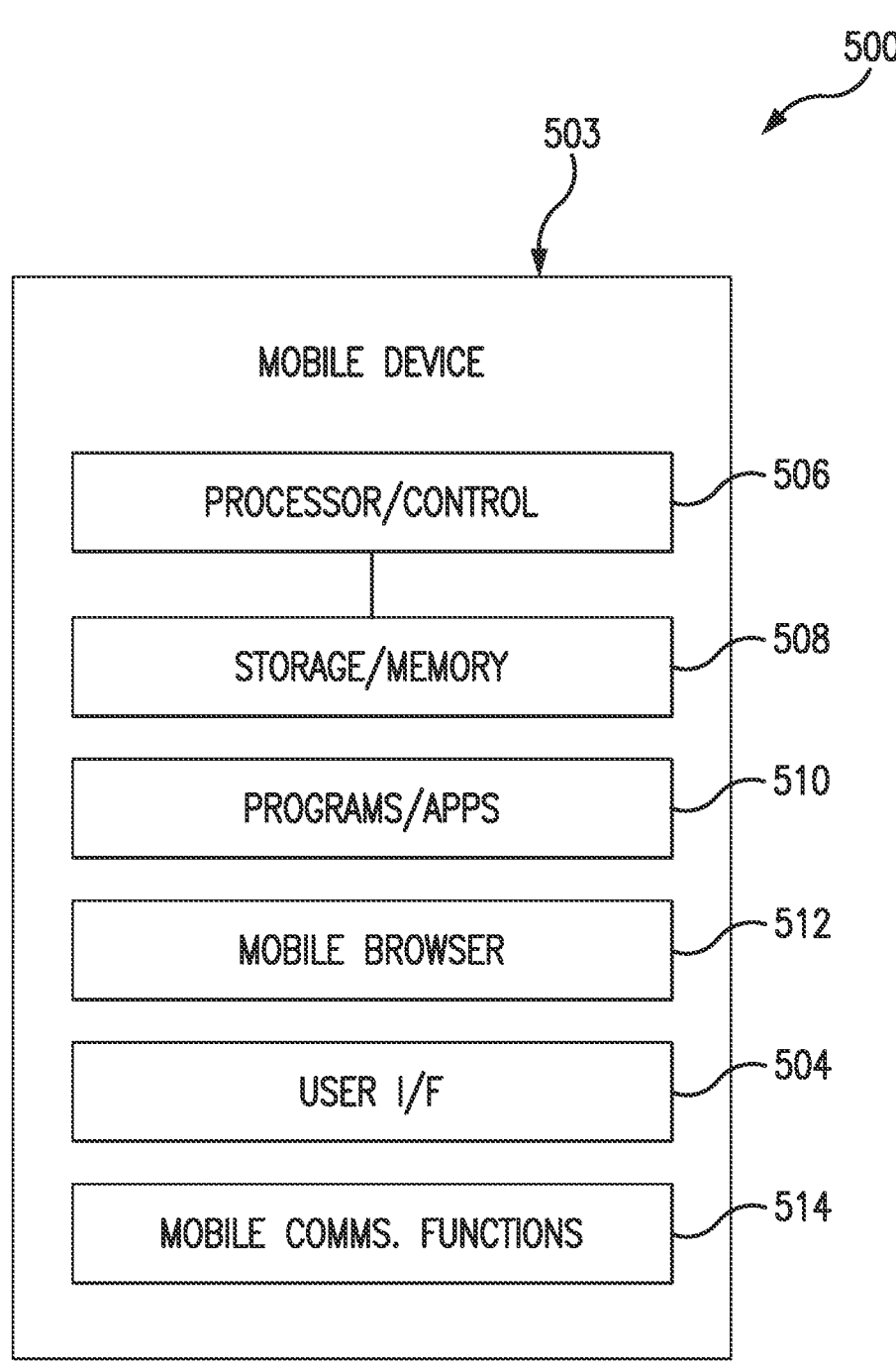
FIG. 5 is a simplified block diagram of an example of a mobile device that may be used in connection with the payment system of FIG. 1.

FIG. 5 is a simplified block diagram of an example embodiment of a mobile device 500 that may be used as the payer's device 112 shown in FIG. 1.

Referring to FIG. 5, the mobile device 500 may include a housing 503. In many embodiments, the front of the housing 503 is predominantly constituted by a touchscreen (not separately shown), which is a key element of the user interface 504 of the mobile device 500.

The mobile device 500 further includes a mobile processor/control circuit 506, which is contained within the housing 503. Also included in the mobile device 500 is a storage/memory device or devices (reference numeral 508). The storage/memory devices 508 are in communication with the processor/control circuit 506 and may contain program instructions to control the processor/control circuit 506 to manage and perform various functions of the mobile device 500. As is well-known, a device such as mobile device 500 may function as what is in effect a pocket-sized personal computer (assuming for example that the mobile device is a smartphone), via programming with a number of application programs, or "apps," as well as a mobile operating system (OS). (The apps are represented at block 510 in FIG. 5, and may, along with other programs, in practice be stored in block 508, to program the processor/control circuit 506.)

Because it may be particularly relevant to the subject matter of this disclosure, one of the apps—namely a mobile browser—is represented in the drawing as block 512, separate from the other apps 510. The mobile browser 512 may function in a generally conventional manner to allow the mobile device 500 to access resources via the internet.

As is typical for mobile devices, the mobile device 500 may include mobile communications functions as represented by block 514. The mobile communications functions 514 may include voice and data communications via a mobile communication network with which the mobile device 500 is registered.

From the foregoing discussion, it will be appreciated that the blocks depicted in FIG. as components of the mobile device 500 may in effect overlap with each other, and/or there may be functional connections among the blocks which are not explicitly shown in the drawing. It may also be assumed that, like a typical smartphone, the mobile device 500 may include a rechargeable battery (not shown) that is contained within the housing 503 and that provides electrical power to the active components of the mobile device 500.

It has been posited that the mobile device 500 may be embodied as a smartphone, but this assumption is not intended to be limiting, as mobile device 500 may alternatively, in at least some cases, be constituted by a tablet computer or by other types of mobile computing devices.

Figure 6A:
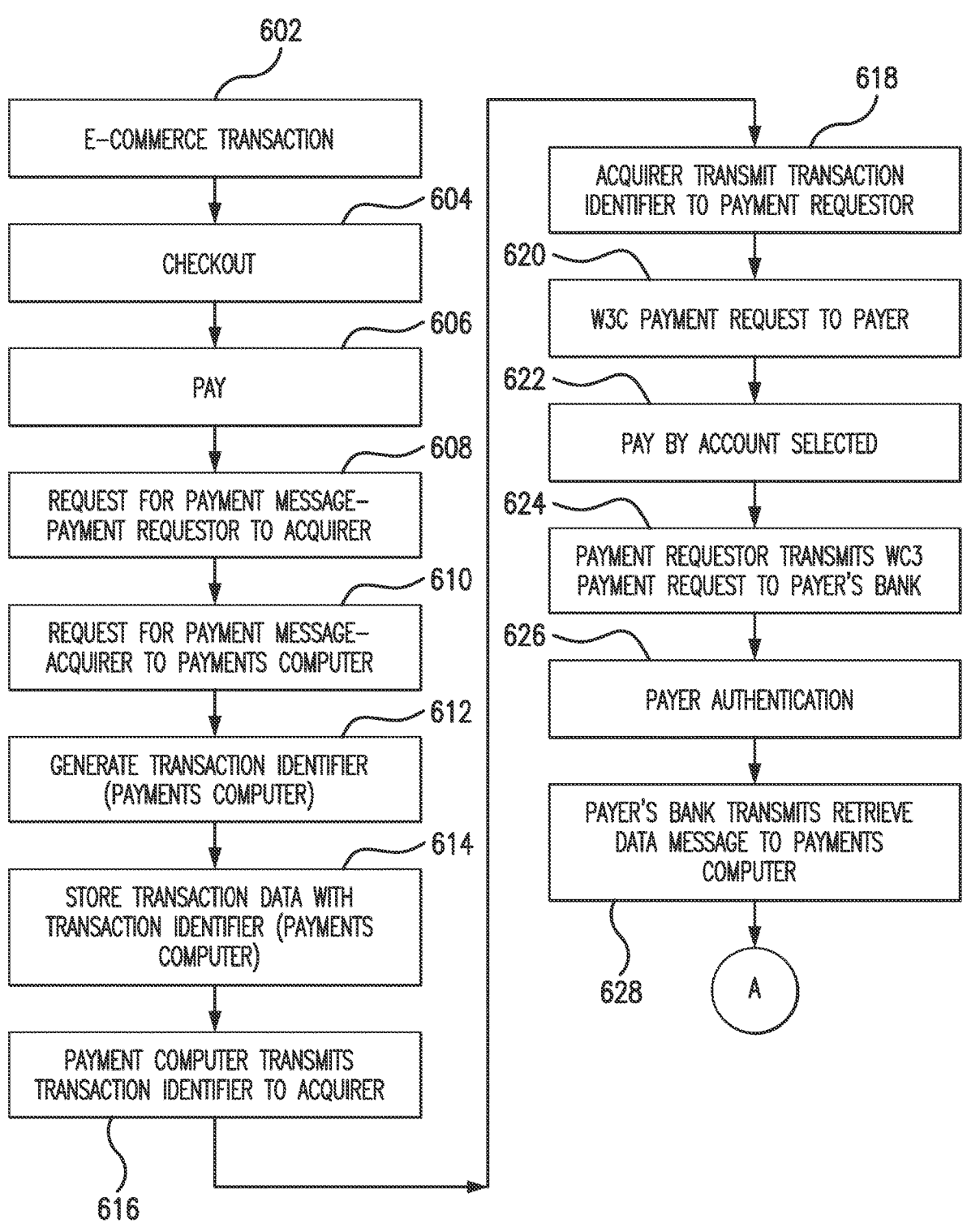
FIGS. 6A and 6B together form a flow chart that illustrates a process that may be performed in the system of FIG. 1 in accordance with aspects of the present disclosure.
Figure 6B:
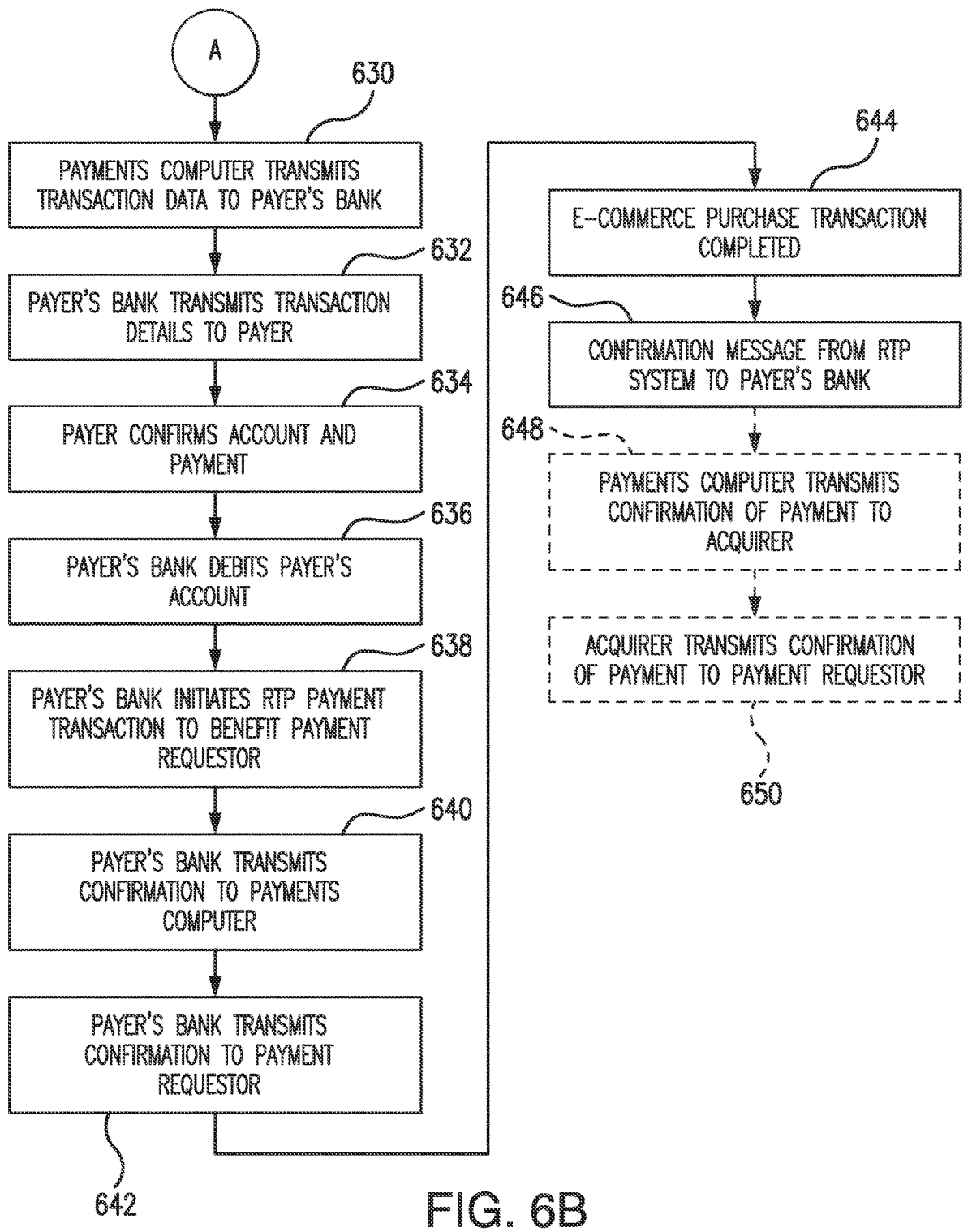

FIGS. 6A and 6B together form a flow chart that illustrates an example of a process that may be performed in the payment system 100 of FIG. 1, according to aspects of the present disclosure.

According to one use case, the payment requestor 114 (FIG. 1) may be an e-commerce merchant, and the process of FIGS. 6A and 6B may entail a payment to consummate an online purchase transaction. The ensuing discussion of FIGS. 6A and 6B will proceed in accordance with this use case, without limitation, and other use cases will be discussed following the discussion of FIGS. 6A and 6B.

The ensuing discussion assumes that the merchant/payment requestor and the acquirer have been enrolled and brought "on board" to the payment system 100. The onboarding process may include obtaining the following information: merchant name, acquirer ID, merchant ID, the bank account number and bank routing number for either or both of the merchant's bank account and the acquirer bank account, along with any other information required for processing in the real-time payment network 104.

At 602 in FIG. 6A, the user/payer 110 operates the payer's device 112 to access an e-commerce website maintained by or for the payment requestor 114. (Alternatively, communication between the payer's device 112 and the merchant website may be "in app" rather than via browser.) As part of the payer's access to the e-commerce website, the payer engages in online shopping and selects one or more items available for purchase through the e-commerce website. At 604, the payer 110 elects to enter a checkout phase of the online shopping session, so as to complete the purchase of the selected items. At 606, the payer 110 indicates to the payment requestor 114 that the payer 110 wishes to initiate the payment portion of the checkout process.

In response to this indication from the payer 110, and as represented at block 608 in FIG. 6A, the payment requestor 114 transmits a "request for payment" message to the acquirer 108. The message may include an order ID, the transaction amount, the merchant ID and the merchant name. This information may be referred to as "transaction data". It may be assumed that the acquirer 108 receives this message.

Next, as indicated at block 610, the acquirer 108 transmits a request for payment message to the payments computer 102. The message may be transmitted via a "submit RFP" API that the payment computer 102 has made available for acquirers. The message sent via the submit RFP API may again include the order ID, the transaction amount, the merchant ID and the merchant name. It may be assumed that the payments computer 102 receives this message.

At block 612, the payments computer 102 may generate a unique transaction identifier for the RFP submitted by the acquirer 108 at block 610. In some embodiments, the transaction identifier may be an 18-character alphanumeric string.

At block 614, the payments computer 102 may store the transaction data in the transaction database 218 (FIG. 2) in association with/indexed by the transaction identifier generated at block 612. The payments computer 102 may also use the merchant ID to look up the bank account number for the merchant/payment requestor (or for the merchant's acquirer bank); the payment computer 102 may store the bank account number as part of the transaction data.

At block 616, the payments computer 102 transmits the transaction identifier (generated at block 612) to the acquirer 108. It may be assumed that the acquirer 108 receives the transaction identifier.

At block 618, the acquirer 108 transmits the transaction identifier to the payment requestor 114. It may be assumed that the payment requestor 114 receives the transaction identifier.

At block 620, the payment requestor 114 submits a digital screen form to the payer 110 to facilitate preparation of a Payment Request in accordance with the well-known WC3 Payment Request API that has been established by the standards organization WC3. The digital screen form includes payment options for the payer 110 to select from. At block 622, the payer 110 selects an option to "pay by account"—i.e., via the payer's bank account at the payer's bank 106.

At block 624, the payment requestor 114 transmits the WC3 Payment Request to the payer's bank 106. The WC3 Payment Request includes the transaction identifier received by the payment requestor 114 at 618. It may be assumed that the payer's bank 106 receives the WC3 Payment Request.

At block 626, the payer 110/payer's device 112 is redirected to the payer's bank 106 for authentication of the payer 110. The authentication may include, for example, biometric authentication and/or entry of a PIN (personal identification number), etc.

At block 628, the payer's bank 106 transmits a request to retrieve transaction data to the payments computer 102. The message may be transmitted via a "retrieve RFP" API that the payment computer 102 has made available for payers' banks. The message sent via the retrieve RFP API may include the transaction identifier received by the payer's bank 106 at block 624. It may be assumed that the payments computer 102 receives the retrieve RFP message.

Referring now to FIG. 6B, at block 630, the payments computer 102 may now transmit some or all of the transaction data to the payer's bank 106. The transaction data referred to in the previous sentence is that which the payments computer had previously stored in association with the transaction identifier now presented by the payer's bank 106. In preparing to transmit the transaction data to the payer's bank 106, the payments computer may have retrieved the transaction data from the transaction database 218 (FIG. 2), using the transaction identifier presented by the payer's bank 106. The transaction data provided to the payer's bank 106 at this step may include the bank account number/routing number for the payment requestor 114 or the acquirer 108, as the case may be.

Continuing to refer to FIG. 6B, at block 632, the payer's bank 106 may transmit some details regarding the transaction to the payer's device 112. The transaction details transmitted to the payer's device 112 at this step may be sufficient for the payer 110 to recognize and confirm that the transaction referenced by the transaction details is the same transaction the payer 110 opted to pay for at block 606 (FIG. 6A). The transaction details transmitted at this block 632 may also include an identifier for the payer's bank account from which the payment is to be made. It may be assumed that the payer's device 112 receives the transaction details transmitted to it at this block 632.

Continuing to refer to FIG. 6B, at block 634, the payer 110 may interact with the payer's device 112 to indicate that the payer 110 confirms the transaction/payment and the funding bank account as presented to the payer 110 at block 632. A message is transmitted from the payer's device 112 to the payer's bank 106 to indicate that the payer 110 has confirmed the transaction and the account. It may be assumed that the payer's bank 106 receives this message.

The payer's bank 106 now proceeds with the requested payment. At block 636, the payer's bank 106 debits the transaction amount from the payer's account. At block 638, the payer's bank sends an instruction to the real-time payment network 104 to transfer the transaction amount to the account of the payment requestor 114 or the acquirer 108, as the case may be, for the benefit of the payment requestor 114. With this process, the payment requestor may immediately receive the funds paid for the online purchase transaction referred to at blocks 602-606 (FIG. 6A).

Continuing to refer to FIG. 6B, at block 640, the payer's bank may transmit a payment confirmation message to the payments computer 102. This message may be transmitted via a "confirmation RFP" API that the payments computer 102 has made available for payers' banks.

At block 642, the payer's bank 106 may transmit a payment confirmation message to the payment requestor 114. At this point, now that the payment requestor 114 knows that the payment for the transaction has occurred, the e-commerce purchase transaction may be completed (block 644). That is, the payment requestor 114 may inform the payer/user 110 that payment has been accomplished and that the order is complete, and the payment requestor 114 may proceed to fulfill the order.

At block 646, the real-time payment network 104 may send a payment transaction confirmation to the payer's bank 106.

In some embodiments, additional steps (shown in phantom in FIG. 6B) may also be performed to provide further confirmation of payment. Thus, at block 648, the payments computer 102 may send a confirmation of payment message to the acquirer 108. At block 650, the acquirer 108 may send a confirmation of payment message to the payment requestor 114. The confirmation sent at block 648 may be transmitted via a "notification RFP" API that the payments computer 102 has made available for communication with acquirers.

In the process of FIGS. 6A and 6B, APIs provided for bank communication with the payments computer 102 allow for easily established messaging pathways to support convenient access to a real-time payment network for use in a P2M payment in support of an e-commerce transaction. If the real-time payment network has no RFP function, the API based messaging around the payments computer 102 effectively provides merchants, customers and their banks with RTP-based access to the fast-payment capabilities of the real-time payment network. Even if the real-time payment network does have an RFP function, the process of FIGS. 6A and 6B obviates the need for the acquirer and payer's bank to undergo the possibly onerous process of integrating to the real-time payment network's proprietary RFP function.

Furthermore, with the process of FIGS. 6A and 6B, neither the merchant/payment requestor nor the acquirer bank ever has access to the payer's bank account information thereby protecting the security of that information. The real-time payment network also never receives this information. User authentication for each transaction and user confirmation of each transaction provide a high degree of security and help to minimize chargebacks and fraud.

Still further, the onboarding of the banks for this type of process may be much more rapid than for other payment systems.

In addition, the advantages of a real-time payment network are made applicable to P2M and other transactions, without requiring either the payer or the payment requestor to be enrolled members of the real-time payment network.

The teachings of this disclosure have up to now been discussed in the context of a P2M ecommerce use case. As noted above, however, the current disclosure also is applicable to a number of other use cases. For example, in one P2P use case, a service provider such as a provider of house-cleaning or landscaping services may be the payment requestor/payee and may present an invoice electronically to the payer for services rendered. Once the payer selects a "pay invoice" option on the payer's device, the process of FIGS. 6A-6B may be triggered from step 608 onward.

In another P2P use case, a remittance may be requested electronically by a remittance payee/payment requestor to the payer. Once the payer indicates that the remittance should occur, again steps 608 onward of FIGS. 6A-6B may be triggered.

Business to business (B2B) use cases may also be implemented with a vendor business/payment requestor submitting an invoice electronically to a business vendee/payer. Again payer approval of the invoice may launch steps 608 et al. of the process of FIGS. 6A-6B.

The process of FIGS. 6A-6B can also be applied to bill-pay use cases, including for example, payment of tax bills rendered by government entities, payment of utility bills, mortgage bills, tuition bills, or other bill payment applications. The renderer of the bill/payment requestor may transmit the bill electronically to the payer, who then approves the bill to launch the process of FIGS. 6A-6B from step 608 onward.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The above descriptions and illustrations of processes herein should not be considered to imply a fixed order for performing the process steps. Rather, the process steps may be performed in any order that is practicable, including simultaneous performance of at least some steps and/or omission of steps.

Although the present disclosure has been described in connection with specific example embodiments, it should be understood that various changes, substitutions, and alterations apparent to those skilled in the art can be made to the disclosed embodiments without departing from the spirit and scope of the appended claims.

What is claimed is:

1. A computing system comprising:

a storage device configured to store a plurality of application programming interfaces (APIs) of a payments computer; and a payments computer processor of the payments computer configured to:

receive, via a submit Request For Payment (RFP) API of the plurality of APIs from an acquirer server of a payment requestor, transaction data of an electronic payment transaction between the payment requestor and a payer utilizing a payer's device prior to the electronic payment transaction being authorized by a real-time payment network, wherein the real-time payment network does not need to have an RFP message function, and at least one of the payment requestor and the payer do not need to be registered to use the real-time payment network, generate a unique transaction identifier comprising an alphanumeric string corresponding to the transaction data, store, in a transaction database of the storage device, a mapping of the generated unique transaction identifier to the transaction data, transmit the unique transaction identifier to the acquirer server to send to the payment requestor, thus establishing a communication path around the real-time payment computer, receive, from a payer's bank computer via a retrieve RFP API of the plurality of APIs, a retrieval request prior to the electronic payment transaction being authorized by the real-time payment network, wherein the retrieval request comprises the unique transaction identifier, retrieve, in response to the retrieval request by using the received unique transaction identifier, the transaction data stored in the transaction database;

transmit the stored transaction data to the payer's bank computer, receive, from the payer's bank computer via a confirmation RFP API of the plurality of APIs, a confirmation message confirming that the electronic payment transaction has been authorized by the real-time payment network, and transmit, to the acquirer server via a notification RFP API of the plurality of APIs, a confirmation of payment message.

2. The computing system of claim 1, wherein the retrieval request further comprises transaction data provided from the payer's bank computer, and wherein the processor is further configured to recognize the retrieval request based on a similarity between the transaction data stored in the mapping and the transaction data provided from the payer's bank computer.

3. The computing system of claim 1, wherein the processor is configured to retrieve a payment account number of the payer from within the transaction data based on the transaction identifier received from the payer's bank computer and transmit the payment account number of the payer to payer's bank computer.

4. The computing system of claim 1, wherein the processor is further configured to retrieve a payment account number of the payment requestor based on the merchant identifier included in the transaction data, and store the payment account number of the payment requestor within the transaction data stored in the mapping.

5. The computing system of claim 4, wherein the processor is configured to transmit the payment account number of the payment requestor retrieved based on the merchant identifier to the payer's bank computer in response to the retrieval request from the payer's bank computer.

6. The computing system of claim 1, wherein the processor is configured to receive the transaction data from a checkout page of a website hosted by the payment requestor during an online session between a computing device of the payment requestor and the payer's device.

7. A method comprising:

receiving, by a payments computer via a submit Request For Payment (RFP) application programming interface (API) of a plurality of programming interfaces (APIs) from an acquirer server of a payment requestor, transaction data of an electronic payment transaction between the payment requestor and a payer utilizing a payer's device prior to the electronic payment transaction being authorized by a real-time payment network, wherein the real-time payment network does not need to have an RFP message function, and at least one of the payment requestor and the payer do not need to be registered to use the real-time payment network;

generating, by the payments computer, a unique transaction identifier comprising an alphanumeric string corresponding to the transaction data;

storing, by a payments computer in a transaction database of the storage device, a mapping of the generated unique transaction identifier to the transaction data;

transmitting, by the payments computer, the unique transaction identifier to the acquirer server to send to the payment requestor, thus establishing a communication path around the real-time payment computer;

receiving, by the payments computer from a payer's bank computer via a retrieve RFP API of the plurality of APIs, a retrieval request prior to the electronic payment transaction being authorized by the real-time payment network, wherein the retrieval request comprises the unique transaction identifier;

retrieving, by the payments computer in response to the retrieval request by using the received unique transaction identifier, the transaction data stored in the transaction database;

transmitting, by the payments computer, the transaction data to the payer's bank computer;

receiving, by the payments computer from the payer's bank computer via a confirmation RFP API of the plurality of APIs, a confirmation message confirming that the electronic payment transaction has been authorized by the real-time payment network; and transmitting, by the payments computer to the acquirer server via a notification RFP API of the plurality of APIs, a confirmation of payment message.

8. The method of claim 7, wherein the retrieval request further comprises transaction data provided from the payer's bank computer, and the method further comprises recognizing, by the payments computer, the retrieval request based on a similarity between the transaction data stored in the mapping and the transaction data provided from the payer's bank computer.

9. The method of claim 7, wherein the transmitting of the transaction data comprises retrieving, by the payments computer, a payment account number of the payer from within the transaction data based on the transaction identifier received from the payer's bank computer and transmitting the payment account number of the payer to the payer's bank computer.

10. The method of claim 7, wherein the method further comprises retrieving a payment account number of the payment requestor based on a merchant identifier included in the transaction data, and storing the payment account number of the payment requestor within the transaction data stored in the mapping.

11. The method of claim 10, wherein the transmitting of the transaction data further comprises transmitting, by the payments computer, the payment account number of the payment requestor retrieved based on the merchant identifier to the payer's bank computer in response to the retrieval request from the payer's bank computer.

12. The method of claim 7, wherein the receiving comprises receiving the transaction data from a checkout page of a website hosted by the payment requestor during an online session between a computing device of the payment requestor and the payer's device.

13. A non-transitory computer-readable medium comprising instructions which when executed by a processor cause a computer to perform a method comprising:

receiving, via a submit Request For Payment (RFP) application programming interface (API) of a plurality of stored application programming interfaces (APIs) from an acquirer server of a payment requestor, transaction data of an electronic payment transaction between the payment requestor and a payer utilizing a payer's device prior to the electronic payment transaction being authorized by a real-time payment network, wherein the real-time payment network does not need to have an RFP message function, and at least one of the payment requestor and the payer do not need to be registered to use the real-time payment network;

generating a unique transaction identifier comprising an alphanumeric string corresponding to the transaction data;

storing, in a transaction database, a mapping of the generated unique transaction identifier to the transaction data;

transmitting the unique transaction identifier to the acquirer server to send to the payment requestor;

transmitting the unique transaction identifier to the acquirer server to send to the payment requestor, thus establishing a communication path around the real-time payment computer;

receiving, from a payer's bank computer via a retrieve RFP API of the plurality of APIs, a retrieval request prior to the electronic payment transaction being authorized by the real-time payment network, wherein the retrieval request comprises the unique transaction identifier;

retrieving, in response to the retrieval request by using the received unique transaction identifier, the transaction data stored in the transaction database;

transmitting the transaction data to the payer's bank computer;

receiving, from the payer's bank computer via a confirmation RFP API of the plurality of APIs, a confirmation message confirming that the electronic payment transaction has been authorized by the real-time payment network; and transmitting, by the payments computer to the acquirer server via a notification RFP API of the plurality of APIs, a confirmation of payment message.

14. The non-transitory computer-readable medium of claim 13, wherein the retrieval request further comprises transaction data provided from the payer's bank computer, and wherein the method further comprises recognizing the retrieval request based on a similarity between the transaction data stored in the mapping and the transaction data provided from the payer's bank computer.

15. The non-transitory computer-readable medium of claim 13, wherein the transmitting comprises retrieving a payment account number of the payer from within the transaction data based on the transaction identifier received from the payer's bank computer, and transmitting the payment account number of the payer to the payer's bank computer.

16. The non-transitory computer-readable medium of claim 13, wherein the method further comprises retrieving a payment account number of the payment requestor based on a merchant identifier included in the transaction data, and storing the payment account number of the payment requestor within the transaction data stored in the mapping.

17. The non-transitory computer-readable medium of claim 16, wherein the transmitting further comprises transmitting the payment account number of the payment requestor retrieved based on the merchant identifier to the payer's bank computer-in response to the retrieval request from the payer's bank computer.

* * * * *